(12) United States Patent
Rozic et al.

(10) Patent No.: US 9,405,719 B2
(45) Date of Patent: Aug. 2, 2016

(54) CIRCUITRY TO GENERATE AND/OR USE AT LEAST ONE TRANSMISSION TIME IN AT LEAST ONE DESCRIPTOR

(75) Inventors: Reuven Rozic, Binyamina (IL); Eric K. Mann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 13/993,710

(22) PCT Filed: Nov. 11, 2011

(86) PCT No.: PCT/US2011/060396
§ 371 (c)(1),
(2), (4) Date: Jul. 31, 2013

(87) PCT Pub. No.: WO2013/070241
PCT Pub. Date: May 16, 2013

(65) Prior Publication Data
US 2013/0304953 A1    Nov. 14, 2013

(51) Int. Cl.
*G06F 13/42* (2006.01)
*H04L 12/815* (2013.01)
*H04L 12/875* (2013.01)
*H04L 12/801* (2013.01)

(52) U.S. Cl.
CPC .............. *G06F 13/42* (2013.01); *H04L 47/22* (2013.01); *H04L 47/564* (2013.01); *H04L 47/12* (2013.01)

(58) Field of Classification Search
CPC ............................... G06F 13/36; G06F 13/364
USPC ........................... 710/105, 307; 713/300–340
See application file for complete search history.

(56) References Cited

U.S. PATENT DOCUMENTS

| | | | |
|---|---|---|---|
| 5,867,230 A | 2/1999 | Wang et al. | |
| 7,046,628 B2 | 5/2006 | Luhmann et al. | |
| 7,426,610 B2 | 9/2008 | Lakshmanamurthy et al. | |
| 2004/0215804 A1* | 10/2004 | Tan | H04L 29/06027 |
| | | | 709/231 |

FOREIGN PATENT DOCUMENTS

WO    2013/070241 A1    5/2013

OTHER PUBLICATIONS

International Preliminary Report on Patentability and Written Opinion received for PCT Patent Application No. PCT/US2011/060396, mailed on May 22, 2014, 6 pages.
International Search Report and Written Opinion received for PCT Patent Application No. PCT/US2011/060396, mailed on Aug. 28, 2012, 9 pages.
Intel, "Latency Tolerance Reporting", PCI Express Base Specification version 2.0, Aug. 14, 2008, 11 pages.

* cited by examiner

*Primary Examiner* — Tim T Vo
*Assistant Examiner* — Kim T. Huynh
(74) *Attorney, Agent, or Firm* — Christopher K. Gagne

(57) ABSTRACT

An embodiment may include circuitry that may generate and/or use, at least in part, at least one descriptor to be associated with at least one packet. The at least one descriptor may specify at least one transmission time at which the at least one packet is to be transmitted. The at least one transmission time may be specified in the at least one descriptor in such a manner as to permit the at least one transmission time to be explicitly identified based at least in part upon the at least one descriptor. Many alternatives, modifications, and variations are possible without departing from this embodiment.

21 Claims, 3 Drawing Sheets

100

CIRCUITRY TO GENERATE AND/OR USE AT LEAST ONE TRANSMISSION TIME IN AT LEAST ONE DESCRIPTOR

FIELD

This disclosure relates to generating and/or using, at east in part, at least one descriptor.

BACKGROUND

In one conventional network arrangement, a communication stream is transmitted from a first host to a second host. The stream includes a plurality of packets. Software processes in the first host select the average timing of transmission or maximum latency of the packets so as to maintain a predictable data transmission rate for the packets. The second host includes a buffer to store the packets received from the first host.

In this conventional arrangement, the actual tinning of transmission of any given individual packet in the steam may vary, so long as the overall average timing of the transmission or maximum latency of the packets in the stream (i.e., taking into account all of the packets in the stream) conform to what has been selected for these parameters by the software processes in the first host. In order to prevent buffer overflow in the second host, the size of the buffer in the second host is selected so as to conform to the maximum buffering requirements that may be expected to prevail in a worse case communication scenario involving the stream (i.e., in a worst case communicate scenario given the average packet transmission timing or maximum packet latency selected by the software processes). This may result in inure buffer memory being allocated for packet storage than is desirable. This may make buffer memory usage and/or allocation less efficient.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
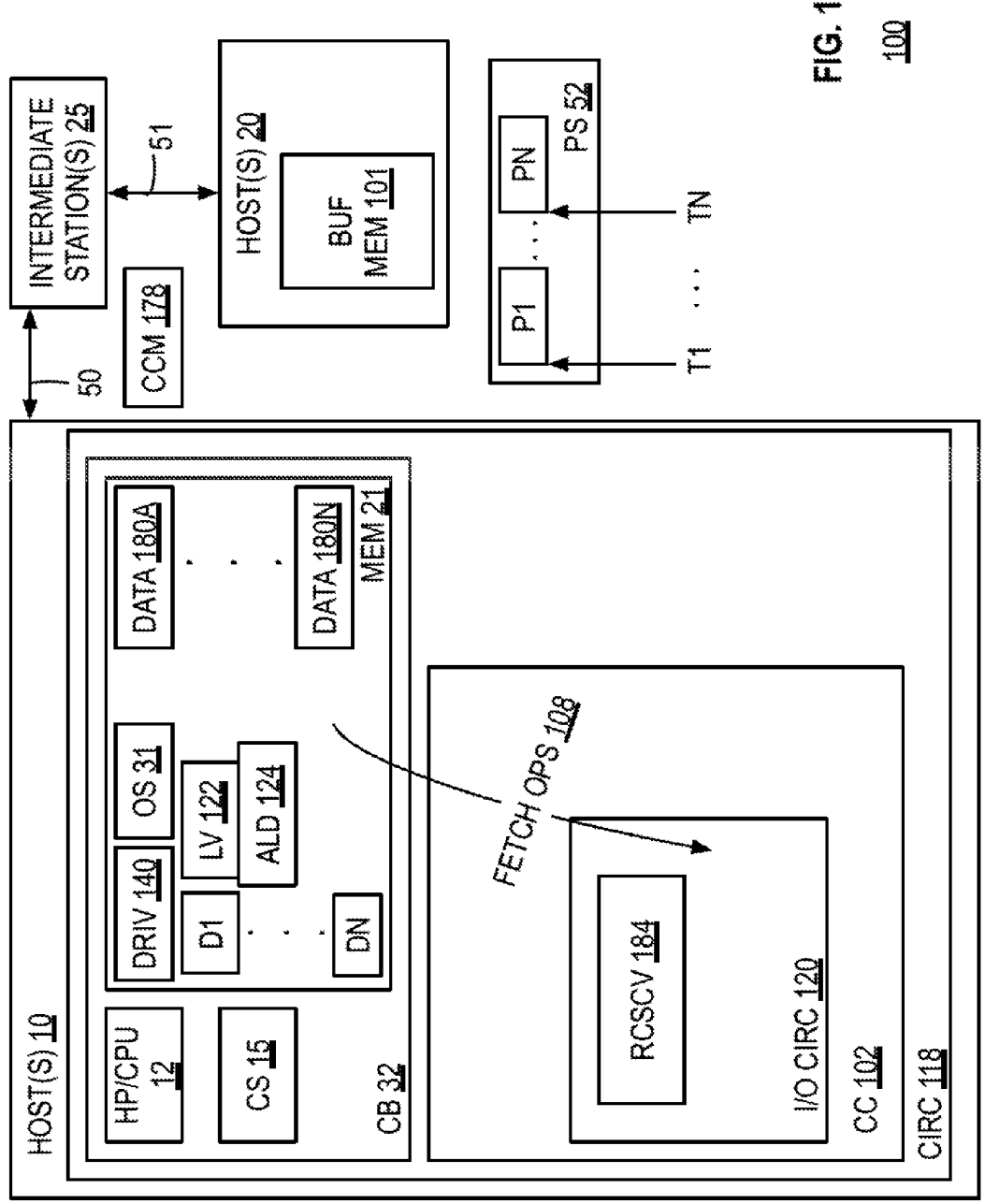
FIG. 1 illustrates a system embodiment.

FIG. 1 illustrates a system embodiment 100. System 100 may include one or more host 10 that may be communicatively coupled to one or more intermediate stations 25 via one or more wireless and/or wired network communication links 50. One or more intermediate stations 25 may be communicatively coupled to one or more other hosts 20 via one or more wireless and/or wired network communication links 51. In this embodiment, one or more hosts 10 may be or comprise one or more senders of one or more packet streams (PS) 52, and one or more intermediate stations 25 and/or one or more hosts 20 may be or comprise one or more intended receivers of one or more of these streams. For example, in this embodiment, one or more hosts 10 may be or comprise one or more "talkers," and one or more hosts 20 may be or comprise one or more media renderer "listeners," in accordance with, for example, Amendment 12: Forwarding and Queuing Enhancements for Time-Sensitive Streams, institute of Electrical and Electronics Engineers, Inc. (IEEE) Std. 802.1Qav-2009, approved 9 Dec. 2009 (hereinafter, "Time-Sensitive Steam Protocol" or "TSSP"). One or more intermediate stations 25 may be or comprise one or more not shown bridges and/or switches that together with one or more hosts 20 may be comprised in, for example, one or more not shown bridged local area networks.

In this embodiment, one or more hosts 10, intermediate stations 25, and/or hosts 20 may be geographically remote from each other. In an embodiment, the terms "host computer," "host," "server," "client," "network node," "end station," "intermediate station," and "node" may be used interchangeably, and may mean, for example, without limitation, one or more end stations, mobile internet devices, smart phones, media (e.g., audio and/or video) devices, input/output (I/O) devices, tablet computers, appliances, intermediate stations, network interfaces, clients, servers, and/or portions thereof. Also in this embodiment, a "sender" or "talker" may be capable, at least in part, of transmitting, at least in part, one or more packets to one or more "receivers" or "listeners," and a "receiver" or "listener" may be capable, at least in part, of receiving, at least in part, the one or more packets. In this embodiment, a "bridge" and "switch" may be used interchangeably, and may comprise an intermediate station that is capable, at least in part, of receiving, at least in part, one or more packets from one or more talkers, and transmitting, at least in part, the one or more packets to one or more listeners. In this embodiment, a "media renderer" may comprise one or more hosts capable, at least in part, of (1) processing, at least in part, data that may be associated, at least in part, with, (2) encoding, at least in part, audio, video, graphic, display, tactile, image, and/or other and/or additional types of information, and/or (3) decoding, at least in part, such information, where such information may be intended to be, amenable to, and/or capable of at least in part, human sensory perception, audio and/or video playback and/or recording, and/or other physical measurement and/or stimulus.

In this embodiment, a "network" may be or comprise any mechanism, instrumentality, modality, and/or portion thereof that may permit, facilitate, and/or allow, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

in this embodiment, one or more hosts 10, one or more intermediate stations 25, and/or one or more hosts 20 may be, constitute, or comprise one or more respective network hops from and/or to which one or more PS 52 may be propagated. In this embodiment, a hop or network hop may be or comprise one or more nodes in a network to and/or from which one or more packets may be transmitted (e.g., in furtherance of reaching and/or to reach an intended destination).

One or more hosts 10 may comprise circuitry 118. Circuitry 118 may comprise circuit board (CB) 32 and one or more circuit cards (CC) 102. In this embodiment, CB 32 may comprise, for example, a system motherboard that may be physically and communicatively coupled to one or more CC 102 via a not shown bus connector/slot system. CB 32 may comprise one or more single and/or multi-core host processors (HP) 12 and computer-readable/writable memory 21. CB 32 also may comprise one or more chipsets (CS) 15 which may comprise, e.g., memory, input/output (I/O) controller circuitry, and/or network interface controller circuitry. One or more host processors 12 may be communicatively coupled via the one or more chipsets 15 to memory 21 and CC 102. CC 102 may comprise I/O circuitry 120. I/O circuitry 120 may be or comprise, for example, storage, network interface, and/or other controller circuitry.

Alternatively or additionally, although not shown in the Figures, some or all of I/O circuitry 120 and/or the functionality and components thereof may be comprised in, for example, CB 32 (e.g., in one or more host processors 12 and/or the one or more chipsets 15). Also alternatively, one or more host processors 12, memory 21, the one or more chipsets 15, and/or some or all of the functionality and/or components thereof may be comprised in, for example, I/O circuitry 120 and/or one or more CC 102. Many other alternatives are possible without departing from this embodiment.

One or more hosts 20 and/or one or more intermediate stations 25 each may comprise respective components that may be identical or substantially similar, at least in part, in their respective constructions, operations, and/or capabilities to the respective construction, operation, and/or capabilities of the above described (and/other other) components of one or more hosts 10. Of course, alternatively, without departing from this embodiment, the respective constructions, operations, and/or capabilities of one or more hosts 20 and/or one or more intermediate stations 25 (and/or one or more components thereof) may differ, at least in part, from the respective construction, operation, and/or capabilities of one or more hosts 10 (and/or one or more components thereof). In this embodiment, one or more hosts 20 may comprise buffer memory 101 to receive and/or store, at least temporarily, one or more packets (e.g., one or more packets P1 ... PN from one or more streams 52) that may be received by one or more hosts 20 via one or more links 51.

In this embodiment, one or more operating systems (OS) 31 and/or one or more drivers 140 may be executed, at least in part, by one or more host processors 12, circuitry 118, and/or I/O circuitry 120. When so executed, one or more OS 31 and/or one or more drivers 140 may become resident, at least in part, in memory 21. Additionally, in this embodiment, a value may be "predetermined" if the value, at least in part, and/or one or more algorithms, operations, and/or processes involved, at least in part, in generating and/or producing the value is predetermined, at least in part. Also, in this embodiment, a process, thread, daemon, program, driver, virtual machine, virtual machine monitor, operating system, application, and/or kernel each may (1) comprise, at least in part, and/or (2) result, at least in part, in and/or from, execution of one or more operations and/or program instructions. Although one or more drivers 140 and one or more OS 31 are shown in the drawings as being distinct from each other, one or more drivers 140 may be comprised, at least in part, in one or more OS 31, or vice versa, without departing from this embodiment.

In this embodiment, "circuitry" may comprise, for example, singly or in any combination, analog circuitry, digital circuitry, hardwired circuitry, programmable circuitry, co-processor circuitry, processor circuitry, controller circuitry, state machine circuitry, and/or memory that may comprise program instructions that may be executed by programmable circuitry. Also in this embodiment, a host processor, processor, processor core, core, and/or controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, two or more of the following: one or more host processors, storage, mass storage, one or more nodes, and/or memory. Although not shown in the Figures, one or more hosts 10 may comprise a graphical user interface system. The not shown graphical user interface system may comprise, e.g., a respective keyboard, pointing device, and display system that may permit a human user to input commands to, and monitor the operation of, one or more hosts 10, one or more intermediate stations 25, one or more hosts 20, and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, one or more random access memory cells (e.g., embedded in one or more integrated circuit chips that may implement at least in part controller and/or switch functionality), and/or other or later-developed computer-readable and/or writable memory. One or more machine-readable program instructions may be stored in circuitry 118, CB 32, CC 102, memory 21, and/or I/O circuitry 120. In operation of one or more hosts 10, these instructions may be accessed and executed by one or more host processors 12, one or more CS 15, I/O circuitry 120, and/or circuitry 118. When so executed by these components, these one or more instructions may result in these components performing operations described herein as being performed by these components of system 100.

In this embodiment, a portion, subset, or fragment of an entity may comprise all of, more than, or less than the entity. Also in this embodiment, the terms "packet" and "frame" may be used interchangeably and may comprise one or more symbols and/or values.

I/O circuitry 120 may exchange data and/or commands with one or more host 20 via one or more links 50, one or more intermediate stations 25, and/or one or more links 51, in accordance with one or more communication protocols. For example, in this embodiment, these one or more protocols may be compatible with, at least in part, e.g., one or more Ethernet, Transmission Control Protocol/Internet Protocol (TCP/IP), and/or other protocols.

For example, one or more Ethernet protocols that may be utilized in system 100 may comply or be compatible with, at least in part, IEEE 802.3-2008, Dec. 26, 2008; IEEE 802.1Q-2005, May 19, 2006; IEEE 802.11a-1999, Feb. 11, 1999; IEEE 802.11b-1999, Feb. 11, 1999; IEEE 802.11g-2003, Oct. 20, 2003; IEEE 802.11n-2009, Oct. 29, 2009; and/or, IEEE P802.1Qat/D6.0, Draft Standard for Local and Metropolitan Area Networks—Virtual Bridged Local Area Networks—Amendment 9: Stream Reservation Protocol (SRP), Apr. 23, 2010. The TCP/IP protocol that may be utilized in system 100 may comply or be compatible with, at least in part, the protocols described in Internet Engineering Task Force (IETF) Request For Comments (RFC) 791 and 793, published September 1981. Many different, additional, and/or other protocols (including, for example, those stated above) may be used for such data and/or command exchange without departing from this embodiment (e.g., earlier and/or later-developed versions of the aforesaid, related, and/or other protocols).

After, for example, a reset or other event of or in one or more hosts 10, system 100, and/or communication via one or more links 50, etc., I/O circuitry 120 in one or more hosts 10 may transmit, at least in part, to one or more hosts 20, via one or more links 50, one or more intermediate stations 25, and/or one or more links 51, one or more packet steams 52. One or more packet streams 52 may comprise, for example, a plurality of packets P1 ... PN that are transmitted from I/O circuitry 120 at respective transmission times T1 ... TN, In this embodiment, in order to permit the respective transmissions of packets P1 ... PN to be respectively transmitted from circuitry 120 at respective transmission times T2 ... TN, circuitry 118 may generate, at least in part, and/or store in memory 21, prior to the respective transmissions, one or more (and in this embodiment, a plurality of descriptors D1 ... DN to be associated (e.g., respectively) with one or more (and in this embodiment, a plurality of) packets P1 ... PN in the one or more streams 52. Additionally or alternatively, circuitry 118 and/or circuitry 120 may use, at least in part, one or more descriptors D1 ... DN. The respective transmission times T1 ... TN may be specified (e.g., respectively) in the one or more respective descriptors D1 ... DN in such a mariner as to permit the respective transmission times T1 ... TN to be explicitly identified and/or identifiable based at least in part upon the one or more respective descriptors D1 ... DN. For example, the respective contents of the respective descriptors D1 ... DN may explicitly identify the respective transmission times T1 ... TN of the respective packets P1 ... PN in the one or more streams 52.

In this embodiment, a packet stream, communication stream, or communication may be used interchangeably, and may be or comprise a plurality of packets and/or frames, such as, for example, without limitation, a plurality of packets and/or frames that may be related and/or associated with each other, at least in part (e.g., one or more media streams). Also, in this embodiment, a descriptor may comprise one or more commands and/or information associated, at least in part, with data. For example, in this embodiment, descriptors D1 ... DN may be respectively associated with respective data 180A ... 180N (e.g., media data) to be included, at least in part, in packets P1 ... PN, respectively. Although as illustrated in the Figures and described herein, data 180A ... 180N may be distinct from descriptors D1 ... DN, without departing from this embodiment, one or more respective portions of data 180A ... 180N may be respectively comprised, at least in part, in one or more descriptors D1 ... DN.

Figure 2:
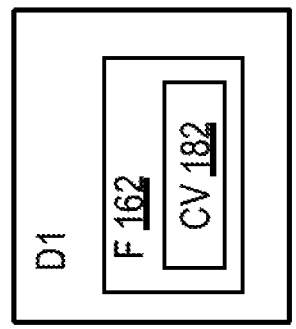
FIG. 2 illustrates features in an embodiment.

In this embodiment, each of the respective descriptors D1 ... DN may comprise a respective field that may specify at least one respective counter value that may expressly identify (e.g., expressly state and/or recite) the one or more respective transmission times T1 ... TN at which the one or more respective packets P1 ... PN may be intended to be transmitted by circuitry 120. For example, as shown in FIG. 2, one or more descriptors D1 may comprises one or more fields 162 that may expressly identify one or more counter values (CV) 182 that may expressly identify the one or more transmission times T1 at which the one or more packets P1 (that are associated with one or more descriptors D1) are to be transmitted from and/or by circuitry 120. The one or more counter values 182 expressly identified in one or more descriptors D1 may be calculated and/or determined with reference to time as measured by a reference clock signal counter value (RC-SCV) 184 that may be maintained by (at least in part), for example, I/O circuitry 120. This reference clock signal counter value 184 may be utilized by I/O circuitry 120 and/or one or more drivers 140 to coordinate respective operations carried out the I/O circuitry 120 and/or one or more drivers 140. By way of example, the reference clock signal counter value may be incremented/decremented in synchrony with a reference clock signal, and/or may comply and/or be compatible with, at least in part, IEEE 802.1AS-2011, IEEE Standard for Local and Metropolitan Area Networks—Timing and Synchronization for Time-Sensitive Applications in Bridged Local Area Networks, Mar. 30, 2011. Of course, other and/or additional techniques may be utilized without departing from this embodiment.

I/O circuitry 120 may determine when to transmit each of the respective packets P1 ... PN in the stream 52 based at least in part upon respective comparisons of the respective counter values comprised in the respective descriptors D1 ... DN associated with the respective packets P1 ... PN to the respective reference clock signal counter values that prevail at the respective times at which the respective comparison are made. For example, in the case of one or more descriptors D1, as the reference clock signal counter value 184 changes in synchrony with the reference clock signal, I/O circuitry 120 may compare (e.g., at periodic time intervals) the one or more counter values 182 in the one or more descriptors DI with the reference clock signal counter value 184. The I/O circuitry 120 may transmit the one or more packets P1 associated with the one or more descriptors D1 when (e.g., exactly concurrently with) the reference clock signal counter value 184 matches the one or more counter values 182.

In this embodiment, the execution of one or more drivers 140 in host 10 may result in one or more HP 12, circuitry 118, and/or one or more drivers 140 generating and/or storing, at least in part, in memory 21 the data 180A ... 180N and their respective associated descriptors D1 ... DN. For example, as generated, at least in part, by the one or more drivers 140, one or more descriptors D1 may comprise one or more fields 162 that may include and/or specify one or more values 182.

Based at least in part upon one or more expected respective latencies and/or the one or more respective transmission times T1 ... TN (e.g., as specified by the one or more respective counter values in the respective descriptors D1 ... DN), I/O circuitry 120 may determine one or more respective earlier times (e.g., that may be respectively earlier than the respective transmission times T1 ... TN). These one or more respective expected latencies may be determined based at least in part upon one or more respective expected fetch latencies associated, at least in part, with respective fetching of data 180A ... 180N, respectively, from host system memory 21 given one or more current power slates (e.g., of one or more components of host 10 that may be involved in carrying out the respective fetching of data 180A ... 180N). These one or more respective earlier times may comprise, for example, one or more respective fetch times at which the respective fetch times are to be initiated and/or one or more respective packet generation times at which the packets P1 ... PN are to be generated, in order to permit the packets P1 ... PN to be respective generated by and/or transmitted from I/O circuitry 120 in accordance with the respective transmission times T1 ... TN identified by the respective counter values in the respective descriptors D1 ... DN.

Figure 3:
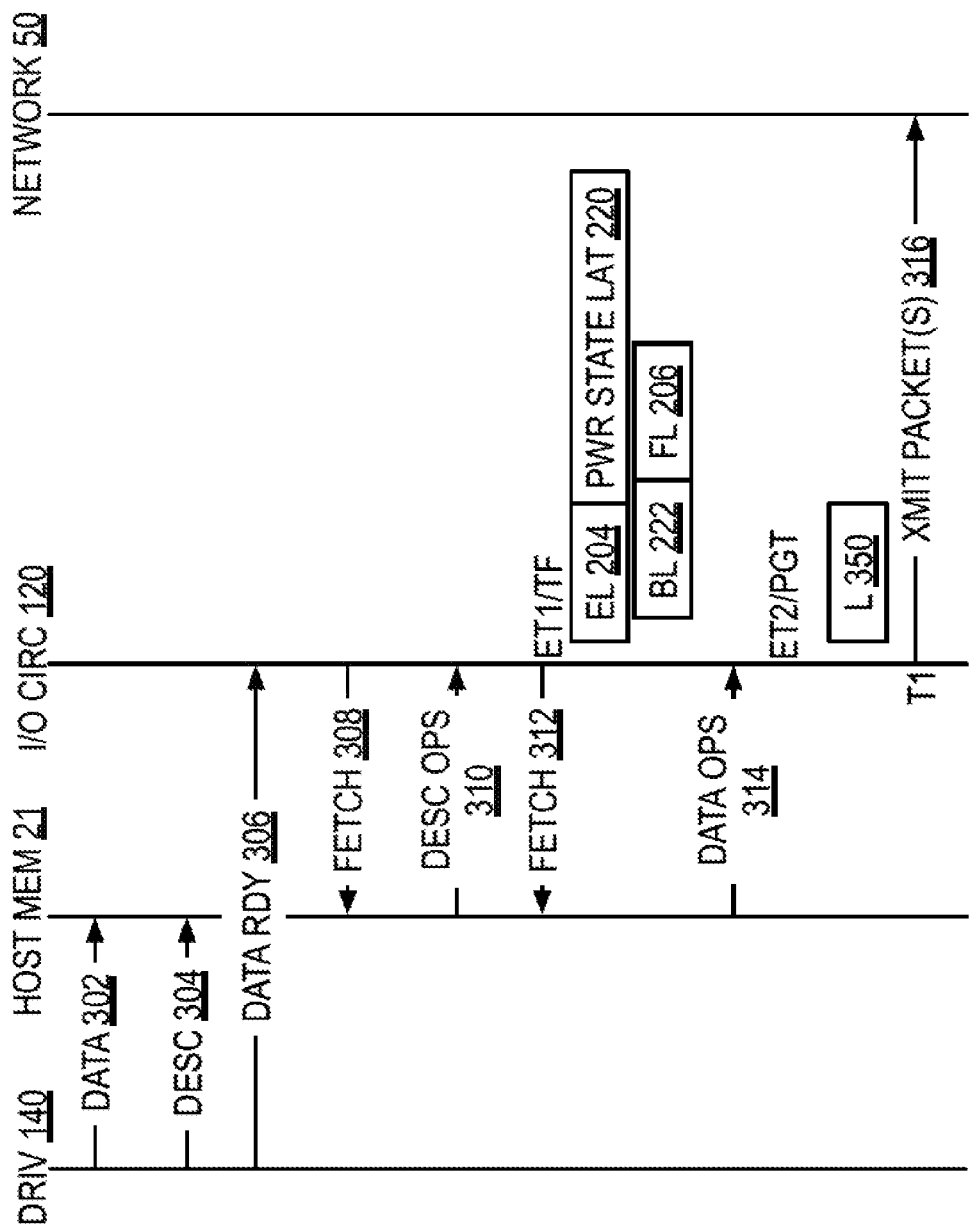
FIG. 3 illustrates features in an embodiment.

For example, in the case of data 180A and its associated one or more descriptors D1, one or more drivers 140 may generate and store in host memory 21 the data 180A and one or more descriptors D1 via one or more operations 302 and one or more operations 304, respectively (see FIG. 3). Thereafter, one or more drivers 140 may signal (via one or more data ready operations 306 shown in FIG. 3) I/O circuitry 120 that data 180A and one or more descriptors D1 have been generated and stored in memory 21.

In response, at least in part, to this signaling by one or more drivers 140 I/O circuitry 120 may fetch (via one or more fetch operations 308) one or more descriptors D1, thereby resulting in circuitry 120 receiving one or more descriptors D1 via one or more transfer operations 310. I/O circuitry 120 may determine, based at least in part, upon one or more values 182 in one or more descriptors DI the one or more transmission times T1 at which one or more packets P1 associated with one or more descriptors D1 are intended to be transmitted from and/or by circuitry 120 to one or more hosts 20. Based at least in part upon this and one or more expected latencies (e.g., symbolically illustrated by element 204 in FIG. 3), I/O circuitry 120 may determine one or more earlier times (e.g., times ET1 and ET2 that are earlier than one or more transmission times T1) at which one or more respective operations are to be performed in order to permit the transmission of the one or more packets P1 to be carried out as scheduled (e.g., at one or more transmission times T1). In this embodiment, these operations may comprise, for example, the initiation of fetching and/or the fetching of the data 180A (associated with the one or more descriptors D1) that is to be included in the one or more packets P1, and/or the generation of the one or more packets P1. Accordingly, one or more earlier times ET1 may comprise one or more fetch times TF at which such initiation of fetching and/or fetching of data 180A are to take place. Also accordingly, one or more earlier times ET2 may comprise one or more packet generation times PGT at which the generation (at least in part) of one or more packets P1 is to occur.

For example, in this embodiment, one or more expected latencies 204 may be determined by circuitry 120, based at least in part, upon one or more expected fetch latencies (e.g., symbolically illustrated by element 206 in FIG. 3) and/or one or more expected packet generation latencies (e.g., symbolically illustrated by element 350 in FIG. 3). These one or more expected fetch latencies 206 may be associated with and/or be expected to arise from, at least in part, fetching of data 180A from memory 21, given (1) the current power state of one or more components (e.g., host processor 12 and/or chipset 15) and/or (2) one or more expected bus latencies (e.g., symbolically illustrated by element 222 in FIG. 3) of one or more not shown buses in host 10 that may be expected to be involved in the fetching of the data 180A from memory 21.

These one or more expected packet generation latencies 350 may be associated with and/or be expected to arise from, at least in part, the operations involved in generating and/or preparing for transmission the one or more packets P1 from circuitry 120. These operations may involve, for example, building, buffering, and/or queuing for transmission the one or more packets P1.

For example, depending upon the particular current power state of the host processor 12 and/or chipset 15, prior to and/or in order to be able to fetch data 180A from memory 21, host processor 12 and/or chipset 15 may undergo one or more power state transitions (e.g., from relatively lower power state such as sleep, suspend, or deep sleep state to relatively higher power state such as being fully powered up). These one or more transitions may involve and/or be subject to one or more power state transition latencies 220. When the host processor 12 and/or chipset 15 are fully powered up, one or more direct memory access (DMA) and/or other transfer operations may be initiated and/or carried out that may involve the host processor 12 and/or chipset 15 that may fetch data 180A from memory 21 to I/O circuitry 120. Such operations also may comprise one or bus transactions involving the not shown bus in host 10. These one or more bus transactions may involve one or more expected bus latencies 222. In determining these one or more expected latencies 204 and/or 206, circuitry 120 may take into account these factors.

In this embodiment, initially (e.g., after an initial activation of host 10 and/or circuitry 120), one or more expected latencies 206 and/or 350 may be based at least in part upon one or more pre-programmed latency values 122 (see FIG. 1). These one or more pre-programmed latency values 122 may be, comprise, and/or be based upon, for example, one or more predetermined expected latencies for similar operations (e.g., similar to those implicating expected latencies 206 and/or 350), and may be derived based upon simulated and/or empirically determined (e.g., average) latencies for similarly configured hosts (e.g., similar to host 10). Thereafter, circuitry 120 may determine one or more expected latencies 206 based upon one or more values 122 and/or upon actual latency data 124 (see FIG. 1). Actual latency data 124 may be derived, at least in part, from measurement (e.g., by circuitry 118, one or more drivers 140, and/or circuitry 120) of actual latencies associated, at least in part, with (1) one or more fetch operations 108 (see FIG. 1) involving, at least in part, memory 21, that may implicate expected latencies 206 and/or (2) building by and/or preparing for transmission from circuitry 120 one or more actual packets (not shown).

In this embodiment, circuitry 120 may calculate one or more earlier times ET1 such that one or more earlier times ET1 may occur at or before one or more transmission times T1 minus the sum of the expected latencies 204 and 350. In other words, if one or more latencies 204 sum to L1 and one or more latencies 350 sum to L2, respectively, then ET1 may occur at or before T1−(L1+L2). Circuitry 120 may calculate one or More earlier times ET2 such that one or More earlier times ET2 may occur after data 180A has been fetched and received by circuitry 120, but at or before one or more transmission times T2 minus the sum of one or more expected latencies 350. In other words, ET2 may occur at or before T1−L2, but after the data 180A has been fetched and received by circuitry 120.

In this embodiment, after circuitry 120 has determined, at least in part, ET1 and ET2, circuitry 120 may initiate and/or fetch (e.g., via one or more operations 312), at one or more times ET1, data 180A from memory 21, based at least in part upon information contained in one or more descriptors D1. This may result in circuitry 120 retrieving and/or receiving (via one or more operations 314) data 180A from memory 21. Thereafter, at one or more times ET2, circuitry 120 may generate and/or prepare for transmission one or more packets P1. Thereafter, at one or more transmission times T1, circuitry 120 may transmit (via one or more operations 316) one or more packets P1 to network 50 for propagation to host 20 (e.g., via one or more stations 25 and/or network 51).

Thus, circuitry 120 may issue, at one or more actual transmission times that may correspond, at least in part, to one or more transmission times T1, one or more packets P1. This may be the case unless, for example, host 10 (e.g., circuitry 120 and/or 118) receives, at least in part, one or more congestion control messages (CCM) 178 (see FIG. 1) from one or more intermediate stations 25 and/or one or more hosts 20. If host 10 receives, at least in part, one or more messages 178, circuitry 120 may adjust the actual issuance time of one or more packets P1, based at least in part upon information determined based, at least in part, upon the one or more messages 178, e.g., in order to by to reduce network congestion and/or to prevent overflow of buffer memory 101 in one or more hosts 20. For example, the actual issuance time selected by circuitry 120 may be after the one or more transmission times T1.

Thus, an embodiment may include circuitry that may generate and/or use, at least in part, at least one descriptor to be associated with at least one packet. The at least one descriptor may specify at least one transmission time at which the at least one packet is to be transmitted. The at least one transmission time may be specified in the at least one descriptor in such a manner as to permit the at least one transmission time to be explicitly identified based at least in part upon the at least one descriptor.

Advantageously, in this embodiment, the actual and/or exact transmission times (e.g., T1 . . . TN) for packets P1 . . . PN in one or more packet streams 52 may be specified in descriptors D1 . . . DN associated with the packets P1 . . . PN. This may permit more careful control and tuning of the timing of packet transmission, and also may reduce and/or bound packet transmission time jitter/variability. This may permit the amount of buffer memory 101 allocated by a receiving host 20 to be more carefully tailored to the specific actual transmission bandwidth of the transmitted packets, instead of being based upon possible worst case scenarios. This may permit the amount of buffer memory 101 allocated to be reduced. This also may make buffer memory usage and/or allocation more efficient. This embodiment also may permit power saving techniques and/or states to continue to be employed (e.g., in connection with host processor 12 and/or chipset 15), without significant modification.

Many other modifications are possible. For example, one or more descriptors D1 . . . DN may be stored in memory 21 prior to or contemporaneous with their associated data 180A . . . 180N becoming valid. Accordingly, this embodiment should be viewed broadly as encompassing all such alternatives, modifications, and variations.

What is claimed is:

1. An apparatus comprising:
   circuitry to at least one of:
      generate, at least in part, at least one descriptor to be associated with at least one packet, the at least one descriptor to specify at least one transmission time at which the at least one packet is to be transmitted, the at least one transmission time being specified in the at least one descriptor in such a manner as to permit the at least one transmission time to be explicitly identified based at least in part upon the at least one descriptor, the circuitry also being to determine, at least in part at least one expected latency associated, at least in part with fetching of data to be comprised, at least in part in the at least one packet the at least one expected latency to be based, at least in part upon at least one current power state of at least one component that is to be involved, at least in part in carrying out the fetching; and
      use, at least in part, the at least one descriptor.

2. The apparatus of claim 1, wherein:
   the at least one descriptor comprises at least one field that specifies at least one counter value that expressly identifies the at least one transmission time; and
   the circuitry comprises input/output (I/O) circuitry to maintain a reference clock signal counter value, the I/O circuitry to determine when to transmit the at least one packet based at least in part upon comparison of the at least one counter value to the reference clock signal counter value.

3. The apparatus of claim 1, wherein:
   the circuitry is to execute, at least in part, at least one driver, the at least one driver to generate, at least in part, both the at least one descriptor and the data to be included, at least in part, in the at least one packet;
   the at least one descriptor, as generated at least in part by the at least one driver, comprises at least one field that specifies at least one value that identifies the at least one transmission time;
   the circuitry comprises input/output (I/O) circuitry to determine, based at least in part upon the at least one expected latency and the at least one transmission time, at least one earlier time, the at least one earlier time being earlier than the at least one transmission time.

4. The apparatus of claim 3, wherein:
   the at least one expected latency is determined based at least in part upon at least one expected fetch latency associated, at least in part, with the fetching of the data from host memory given the at least one current power state; and
   the at least one earlier time comprises at least one of:
      at least one fetch time at which the fetching is to be initiated; and
      at least one packet generation time at which the at least one packet is to be generated, at least in part.

5. The apparatus of claim 4, wherein:
   the at least one expected fetch latency initially is based at least in part upon at least one pre-programmed latency value, and thereafter, is based at least in part upon actual latency data derived, at least in part, from measurement of actual latency associated, at least in part, with one or more data fetching operations involving, at least in part, the host memory.

6. The apparatus of claim 1, wherein:
   the circuitry comprises input/output (I/O) circuitry to determine, based at least in part upon the at least one expected latency and the at least one transmission time, at least one earlier time at which to initiate the fetching of data from host memory, the data to be included, at least in part, in the at least one packet, the at least one earlier time being earlier than the at least one transmission time; and
   the at least one expected latency being associated, at least in part, with at least one of:
      at least one power state transition latency; and
      at least one bus latency.

7. The apparatus of claim 1, wherein:
   a host is to comprise, at least in part, the circuitry;
   the circuitry comprises input/output (I/O) circuitry to issue the at least one packet at at least one actual issuance time that corresponds, at least in part, to the at least one transmission time unless the host receives, at least in part, at least one congestion control message from an intermediate station; and
   if the host receives, at least in part, the at least one congestion control message, the at least one actual issuance time to be adjusted based at least in part upon information determined based, at least in part, upon the at least one congestion control message.

8. A method comprising:
   at least one of generating and using, at least in part, by circuitry, at least one descriptor to be associated with at least one packet, the at least one descriptor to specify at least one transmission time at which the at least one packet is to be transmitted, the at least one transmission time being specified in the at least one descriptor in such a manner as to permit the at least one transmission time to be explicitly identified based at least in part upon the at least one descriptor, the circuitry also being to determine, at least in part, at least one expected latency associated, at least in part with fetching of data to be comprised, at least in part, in the at least one packet the at least one expected latency to be based, at least in part, upon at least one current power state of at least one component that is to be involved, at least in part, in carrying out the fetching.

9. The method of claim 8, wherein:
the at least one descriptor comprises at least one field that specifies at least one counter value that expressly identifies the at least one transmission time; and
the circuitry comprises input/output (I/O) circuitry to maintain a reference clock signal counter value, the I/O circuitry to determine when to transmit the at least one packet based at least in part upon comparison of the at least one counter value to the reference clock signal counter value.

10. The method of claim 8, wherein:
the circuitry is to execute, at least in part, at least one driver, the at least one driver to generate, at least in part, both the at least one descriptor and the data to be included, at least in part, in the at least one packet;
the at least one descriptor, as generated at least in part by the at least one driver, comprises at least one field that specifies at least one value that identifies the at least one transmission time;
the circuitry comprises input/output (I/O) circuitry to determine, based at least in part upon the at least one expected latency and the at least one transmission time, at least one earlier time, the at least one earlier time being earlier than the at least one transmission time.

11. The method of claim 10, wherein:
the at least one expected latency is determined based at least in part upon at least one expected fetch latency associated, at least in part, with the fetching of the data from host memory given the at least one current power state; and
the at least one earlier time comprises at least one of:
 at least one fetch time at which the fetching is to be initiated; and
 at least one packet generation time at which the at least one packet is to be generated, at least in part.

12. The method of claim 11, wherein:
the at least one expected fetch latency initially is based at least in part upon at least one pre-programmed latency value, and thereafter, is based at least in part upon actual latency data derived, at least in part, from measurement of actual latency associated, at least in part, with one or more data fetching operations involving, at least in part, the host memory.

13. The method of claim 8, wherein:
the circuitry comprises input/output (I/O) circuitry to determine, based at least in part upon the at least one expected latency and the at least one transmission time, at least one earlier time at which to initiate the fetching of the data from host memory, the data to be included, at least in part, in the at least one packet, the at least one earlier time being earlier than the at least one transmission time; and
the at least one expected latency being associated, at least in part, with at least one of:
 at least one power state transition latency; and
 at least one bus latency.

14. The method of claim 8, wherein:
a host is to comprise, at least in part, the circuitry;
the circuitry comprises input/output (I/O) circuitry to issue the at least one packet at at least one actual issuance time that corresponds, at least in part, to the at least one transmission time unless the host receives, at least in part, at least one congestion control message from an intermediate station; and
if the host receives, at least in part, the at least one congestion control message, the at least one actual issuance time to be adjusted based at least in part upon information determined based, at least in part, upon the at least one congestion control message.

15. Non-transitory computer-readable memory storing one or more instructions that when executed by a machine result in operations comprising:
at least one of generating and using, at least in part, by circuitry, at least one descriptor to be associated with at least one packet, the at least one descriptor to specify at least one transmission time at which the at least one packet is to be transmitted, the at least one transmission time being specified in the at least one descriptor in such a manner as to permit the at least one transmission time to be explicitly identified based at least in part upon the at least one descriptor, the circuitry also being to determine, at least in part, at least one expected latency associated, at least in part with fetching of data to be comprised, at least in part, in the at least one packet, the at least one expected latency to be based, at least in part, upon at least one current power state of at least one component that is to be involved, at least in part, in carrying out the fetching.

16. The computer-readable memory of claim 15, wherein:
the at least one descriptor comprises at least one field that specifies at least one counter value that expressly identifies the at least one transmission time; and
the circuitry comprises input/output (I/O) circuitry to maintain a reference clock signal counter value, the I/O circuitry to determine when to transmit the at least one packet based at least in part upon comparison of the at least one counter value to the reference clock signal counter value.

17. The computer-readable memory of claim 15, wherein:
the circuitry is to execute, at least in part, at least one driver, the at least one driver to generate, at least in part, both the at least one descriptor and the data to be included, at least in part, in the at least one packet;
the at least one descriptor, as generated at least in part by the at least one driver, comprises at least one field that specifies at least one value that identifies the at least one transmission time;
the circuitry comprises input/output (I/O) circuitry to determine, based at least in part upon the at least one expected latency and the at least one transmission time, at least one earlier time, the at least one earlier time being earlier than the at least one transmission time.

18. The computer-readable memory of claim 17, wherein:
the at least one expected latency is determined based at least in part upon at least one expected fetch latency associated, at least in part, with the fetching of the data from host memory given the at least one current power state; and
the at least one earlier time comprises at least one of:
 at least one fetch time at which the fetching is to be initiated; and
 at least one packet generation time at which the at least one packet is to be generated, at least in part.

19. The computer-readable memory of claim 18, wherein:

the at least one expected fetch latency initially is based at least in part upon at least one pre-programmed latency value, and thereafter, is based at least in part upon actual latency data derived, at least in part, from measurement of actual latency associated, at least in part, with one or more data fetching operations involving, at least in part, the host memory.

20. The computer-readable memory of claim 15, wherein:

the circuitry comprises input/output (I/O) circuitry to determine, based at least in part upon the at least one expected latency and the at least one transmission time, at least one earlier time at which to initiate the fetching of the data from host memory, the data to be included, at least in part, in the at least one packet, the at least one earlier time being earlier than the at least one transmission time; and the at least one expected latency being associated, at least in part, with at least one of:
   at least one power state transition latency; and
   at least one bus latency.

21. The computer-readable memory of claim 15, wherein:

a host is to comprise, at least in part, the circuitry;

the circuitry comprises input/output (I/O) circuitry to issue the at least one packet at at least one actual issuance time that corresponds, at least in part, to the at least one transmission time unless the host receives, at least in part, at least one congestion control message from an intermediate station; and if the host receives, at least in part, the at least one congestion control message, the at least one actual issuance time to be adjusted based at least in part upon information determined based, at least in part, upon the at least one congestion control message.

\* \* \* \* \*